(12) United States Patent
Harada et al.

(10) Patent No.: US 7,602,494 B2
(45) Date of Patent: Oct. 13, 2009

(54) METHOD OF IMAGING FLUORESCENCE AND FLUORESCENCE IMAGING APPARATUS

(75) Inventors: Mitsuo Harada, Hachioji (JP); Yoshihiro Shimada, Haichioji (JP)

(73) Assignee: Olympus Corporation, Tokyo (JP)

( * ) Notice: Subject to any disclaimer, the term of this patent is extended or adjusted under 35 U.S.C. 154(b) by 134 days.

(21) Appl. No.: 11/950,712

(22) Filed: Dec. 5, 2007

(65) Prior Publication Data
US 2008/0152190 A1   Jun. 26, 2008

(30) Foreign Application Priority Data
Dec. 20, 2006  (JP) ............... 2006-343118

(51) Int. Cl.
*G01N 21/64* (2006.01)
(52) U.S. Cl. ...................... 356/417; 356/317
(58) Field of Classification Search ............ 356/317, 356/318, 417
See application file for complete search history.

(56) References Cited

U.S. PATENT DOCUMENTS

| | | |
|---|---|---|
| 6,980,293 B1 | 12/2005 | Harada |
| 2005/0022731 A1 | 2/2005 | Petrillo et al. |
| 2005/0105172 A1 | 5/2005 | Hasegawa et al. |
| 2008/0117421 A1* | 5/2008 | Yamaguchi et al. ......... 356/417 |

FOREIGN PATENT DOCUMENTS

| | | |
|---|---|---|
| EP | 1717630 A1 | 11/2006 |
| JP | 2004531765 | 10/2004 |
| JP | 2005234457 A1 | 9/2005 |

OTHER PUBLICATIONS

Partial European Search Report dated Apr. 10, 2008 in corresponding foreign application, 5 pp.

* cited by examiner

*Primary Examiner*—F. L Evans
(74) *Attorney, Agent, or Firm*—Pillsbury Winthrop Shaw Pittman, LLP

(57) ABSTRACT

A method of imaging fluorescence, in which an inverted fluorescence imaging apparatus provided with an immersion objective is used to image an observation phosphor for a constant term, includes an imaging position locating step of locating a vessel incorporating the observation phosphor at an imaging position of the fluorescence imaging apparatus; a liquid pouring step of pouring a preset amount of liquid between a top portion of the immersion objective in the fluorescence imaging apparatus and the vessel to bring about a charged state; an imaging step of imaging the observation phosphor in the vessel in a state where a space between the top portion of the immersion objective and the vessel is charged with the liquid; and a repeated control step of repeating a series of operations including the liquid pouring step of a single operation and the imaging step of a preset number of times of operations performed after the liquid pouring step of the single operation, at preset time intervals.

13 Claims, 11 Drawing Sheets

METHOD OF IMAGING FLUORESCENCE AND FLUORESCENCE IMAGING APPARATUS

This application claims benefits of Japanese Application No. 2006-343118 filed in Japan on Dec. 20, 2006, the contents of which are incorporated herein by reference.

BACKGROUND OF THE INVENTION

1. Field of the Invention

This invention relates to a method of imaging fluorescence and a fluorescence imaging apparatus which are suitable for imaging fluorescence through observation extending over a long term, such as time-lapse observation, by interposing a liquid between an object to be observed, such as a living specimen, and an objective lens placed below the object.

2. Description of Related Art

In a conventional inverted microscope provided with an immersion objective, a common method of supplying a liquid to an immersion objective in microscopy is to manually pour the liquid by using a pipette. However, when a plurality of specimens are observed like microplate sample observation and time-lapse observation, or when a particular specimen is discontinuously observed for a long term, it is troublesome to manually pour the liquid with the pipette according to the need, and in addition, this imposes a load on a viewer. Thus, in the observation in which the inverted microscope provided with this type of immersion objective is used, the structure that the liquid can be automatically supplied to the immersion objective is proposed, for example, by Japanese Patent Publication No. 2004-531765.

FIG. 1 shows the structure that the liquid is automatically supplied to the immersion objective, set forth in Publication No. 2004-531765.

In FIG. 1, a supplier 51 provided as a liquid pouring means for supplying the liquid to the immersion objective is fixed to an immersion objective 52, and a supply tube 51a provided at the top of the supplier 51 extends close to a top lens 52a of the immersion objective 52 from the side of the immersion objective 52. The structure is such that the liquid can be automatically poured, through the supply tube 51a, between the top lens 52a of the immersion objective 52 and a specimen 54 supported by a specimen holder 53.

In FIG. 1, a trough-shaped absorption means 55 provided as a discharge means is placed around the immersion objective 52 and a discharge tube 56 is connected to the absorption means 55. A liquid flowing from the top lens 52a of the immersion objective 52 is stored in the absorption means 55 so that a stored liquid can be discharged through the discharge tube 56.

SUMMARY OF THE INVENTION

The method of imaging fluorescence according to the present invention, in which an inverted fluorescence imaging apparatus provided with an immersion objective is used to image an observation phosphor for a constant term, comprises an imaging position locating step of locating a vessel incorporating the observation phosphor at an imaging position of the fluorescence imaging apparatus; a liquid pouring step of pouring a preset amount of liquid between a top portion of the immersion objective in the fluorescence imaging apparatus and the vessel incorporating the observation phosphor to bring about a charged state; an imaging step of imaging the observation phosphor in the vessel in a state where a space between the top portion of the immersion objective and the vessel is charged with the liquid; and a repeated control step of repeating a series of operations including the liquid pouring step of a single operation and the imaging step of a preset number of times of operations performed after the liquid pouring step of the single operation, at preset time intervals.

In the method of imaging fluorescence of the present invention, it is desirable that time until the liquid between the top portion of the immersion objective and the vessel, poured at the liquid pouring step, evaporates to reach an uncharged state is previously set as the preset time intervals.

In the method of imaging fluorescence of the present invention, it is desirable that the method further comprises a shift step of shifting relative positions of the immersion objective and the vessel so as to separate the immersion objective from the vessel before the liquid pouring step and an alignment step of shifting the relative positions of the immersion objective and the vessel so as to align the immersion objective with the observation phosphor in the vessel between the liquid pouring step and the imaging step, and that at the repeated control step, a series of operations including the shift step of a single operation, the liquid pouring step of a single operation performed after the shift step of the single operation, the alignment step of a single operation performed after the liquid pouring step of the single operation, and the imaging step of a preset number of times of operations performed after the alignment step of the single operation, are repeated at preset time intervals.

In the method of imaging fluorescence of the present invention, it is desirable that at the shift step, the relative positions of the immersion objective and the vessel are shifted, at least, in a direction perpendicular to the optical axis of the immersion objective.

The method of imaging fluorescence according to the present invention, in which an inverted fluorescence imaging apparatus provided with an immersion objective is used to image an observation phosphor for a constant term, comprises an imaging position locating step of locating a vessel incorporating the observation phosphor at an imaging position of the fluorescence imaging apparatus; a liquid pouring step of pouring a preset amount of liquid between a top portion of the immersion objective in the fluorescence imaging apparatus and the vessel incorporating the observation phosphor to bring about a charged state; an imaging step of imaging the observation phosphor in the vessel in a state where a space between the top portion of the immersion objective and the vessel is charged with the liquid; a detection step of detecting a change of the charged state of the liquid between the top portion of the immersion objective and the vessel, poured at the liquid pouring step; and a repeated control step of repeating a series of operations including the liquid pouring step of a single operation and the imaging step of a preset number of times of operations performed after the liquid pouring step of the single operation when it is detected through the detection step that the liquid between the top portion of the immersion objective and the vessel evaporates to reach an uncharged state.

In the method of imaging fluorescence of the present invention, it is desirable that the method further comprises a shift step of shifting relative positions of the immersion objective and the vessel so as to separate the immersion objective from the vessel before the liquid pouring step and an alignment step of shifting the relative positions of the immersion objective and the vessel so as to align the immersion objective with the observation phosphor in the vessel between the liquid pouring step and the imaging step, and that at the repeated control step, when it is detected through the detection step that the liquid between the top portion of the immersion objective and the vessel evaporates to reach an uncharged state, a series of operations including the shift step of a single operation, the liquid pouring step of a single operation performed after the shift step of the single operation, the alignment step of a single operation performed after the liquid pouring step of the single operation, and the imaging step of a preset number of times of operations performed after the alignment step of the single operation, are repeated.

In the method of imaging fluorescence of the present invention, it is desirable that at the shift step, the relative positions of the immersion objective and the vessel are shifted, at least, in a direction perpendicular to the optical axis of the immersion objective.

The fluorescence imaging apparatus according to the present invention, which is an inverted fluorescence imaging apparatus provided with an immersion objective in which an observation phosphor is observed for a constant term, comprises a liquid pouring means for pouring a preset amount of liquid between a top portion of the immersion objective and a vessel incorporating the observation phosphor; an imaging means for imaging the observation phosphor in the vessel in a state where a space between the top portion of the immersion objective and the vessel is charged with the liquid; and a repeated control means for controlling the liquid pouring means and the imaging means in such a way that a series of operations including a single operation that the liquid is poured between the top portion of the immersion objective and the vessel by the liquid pouring means and a preset number of times of operations that the observation phosphor is imaged by the imaging means are repeated at preset time intervals.

In the fluorescence imaging apparatus of the present invention, it is desirable that the apparatus further comprises a shift means for shifting relative positions of the immersion objective and the vessel so as to separate the immersion objective from the vessel and an alignment means for shifting the relative positions of the immersion objective and the vessel so as to align the immersion objective with the observation phosphor in the vessel and that the repeated control means is constructed to control the shift means, the liquid pouring means, the alignment means, and the imaging means in such a way that a series of operations including a single operation that the relative positions of the immersion objective and the vessel are shifted by the shift means, a single operation that the liquid is poured between the top portion of the immersion objective and the vessel by the liquid pouring means, a single operation that the immersion objective is aligned with the observation phosphor in the vessel by the alignment means, and a preset number of times of operations that the observation phosphor is imaged by the imaging means are repeated at preset time intervals.

The fluorescence imaging apparatus according to the present invention, which is an inverted fluorescence imaging apparatus provided with an immersion objective in which an observation phosphor is observed for a constant term, comprises a liquid pouring means for pouring a preset amount of liquid between a top portion of the immersion objective and a vessel incorporating the observation phosphor; an imaging means for imaging the observation phosphor in the vessel in a state where a space between the top portion of the immersion objective and the vessel is charged with the liquid; a detection means for detecting a change of a charged state of the liquid between the top portion of the immersion objective and the vessel; and a repeated control means for controlling the liquid pouring means and the imaging means in such a way as to repeat a series of operations including a single operation that the liquid is poured between the top portion of the immersion objective and the vessel by the liquid pouring means and a preset of number of times of operations that the observation phosphor is imaged by the imaging means when it is detected through the detection means that the liquid between the top portion of the immersion objective and the vessel evaporates to reach an uncharged state.

In the fluorescence imaging apparatus of the present invention, it is desirable that the apparatus further comprises a shift means for shifting relative positions of the immersion objective and the vessel so as to separate the immersion objective from the vessel and an alignment means for shifting the relative positions of the immersion objective and the vessel so as to align the immersion objective with the observation phosphor in the vessel and that the repeated control means is constructed to control the shift means, the liquid pouring means, the alignment means, and the imaging means in such a way as to repeat a series of operations including a single operation that the relative positions of the immersion objective and the vessel are shifted by the shift means, a single operation that the liquid is poured between the top portion of the immersion objective and the vessel by the liquid pouring means, a single operation that the immersion objective is aligned with the observation phosphor in the vessel by the alignment means, and a preset number of times of operations that the observation phosphor is imaged by the imaging means when it is detected through the detection means that the liquid between the top portion of the immersion objective and the vessel evaporates to reach an uncharged state.

In the method of imaging fluorescence and the fluorescence imaging apparatus, it is desirable that the vessel is a preset well on a multiple-well plate having a plurality of wells.

According to the method of imaging fluorescence and the fluorescence imaging apparatus, it is possible to maintain a favorable poured state of a liquid and to obtain a favorable fluorescent image without making a viewer continuously monitor the poured state of the liquid for a long term in observation extending over a long term such as time-lapse observation.

These and other features and advantages of the present invention will become apparent from the following detailed description of the preferred embodiments when taken in conjunction with the accompanying drawings.

DETAILED DESCRIPTION OF THE PREFERRED EMBODIMENTS

First Aspect

Figure 1:
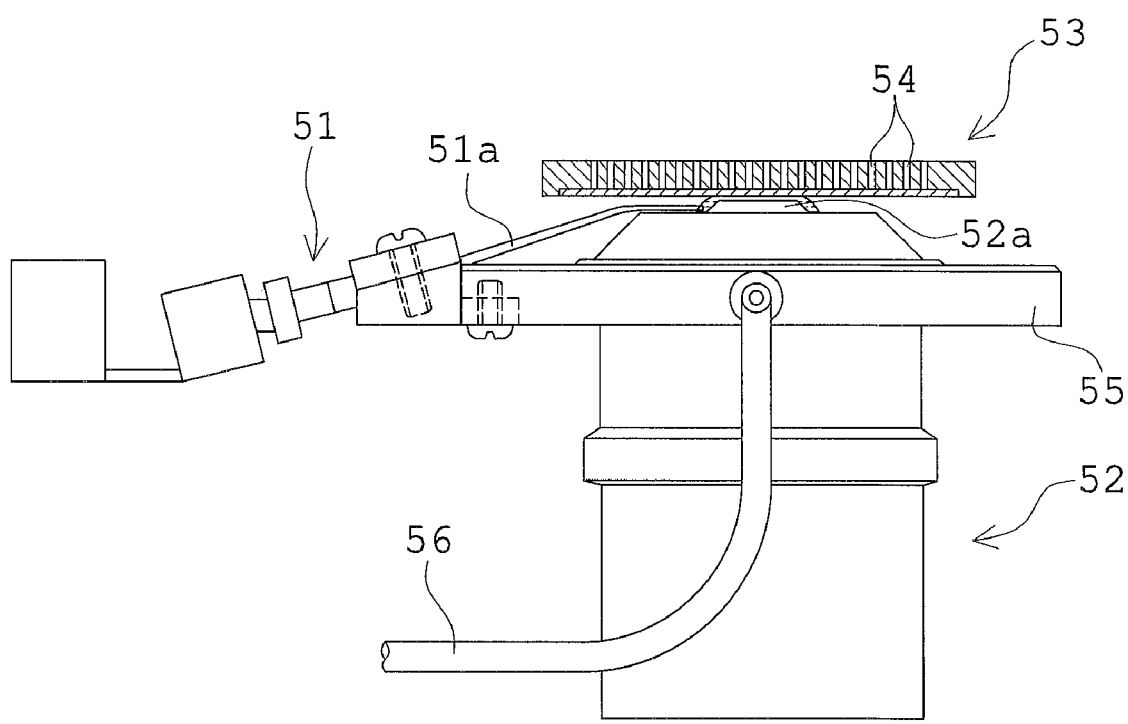
FIG. 1 is an explanatory view showing a structure that a liquid is automatically supplied to an immersion objective, set forth in Japanese Patent Publication No. 2004-531765.
Figure 2:
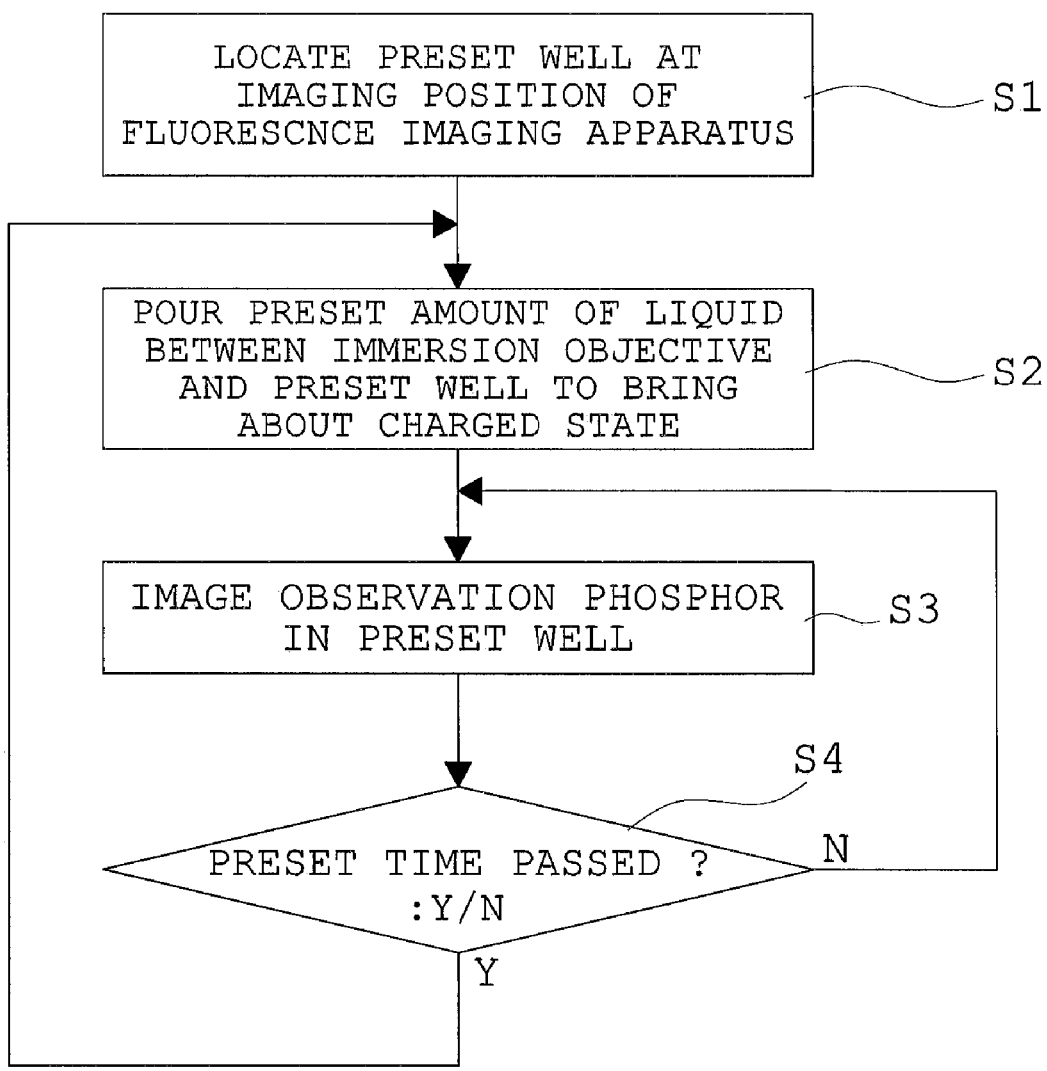
FIG. 2 is a flow chart illustrating the imaging procedure of the method of imaging fluorescence in a first aspect of the present invention.

FIG. 2 is a flow chart illustrating the imaging procedure of the method of imaging fluorescence in the first aspect of the present invention.

The method of imaging fluorescence in the first aspect, in which an inverted fluorescence imaging apparatus provided with an immersion objective is used to image an observation phosphor for a constant term, comprises an imaging position locating step S1, a liquid pouring step S2, an imaging step S3, and a repeated control step S4.

At the imaging position locating step S1, a preset well in a vessel having a plurality of wells in which observation phosphors are incorporated is located at the imaging position of the fluorescence imaging apparatus.

At the liquid pouring step S2, a preset amount of liquid is poured between the top portion of the immersion objective in the fluorescence imaging apparatus and the preset well incorporating an observation phosphor to bring about a charged state.

At the imaging step S3, the observation phosphor in the preset well where the space between the top portion of the immersion objective and the preset well is charged with the liquid is imaged.

At the repeated control step S4, a series of operations including the liquid pouring step S2 of a single operation and the imaging step S3 of a preset number of times of operations performed after the liquid pouring step S2 of the single operation are repeated at preset time intervals.

According to the method of imaging fluorescence in the first aspect, the repeated control step S4 is taken so that a series of operations including the liquid pouring step S2 of a single operation and the imaging step S3 of a preset number of times of operations performed after the liquid pouring step S2 of the single operation are repeated at preset time intervals. Hence, the preset time intervals are set as time until the liquid between the top portion of the immersion objective and the preset well, poured at the liquid pouring step S2, evaporates to reach an uncharged state, and thereby even though a viewer does not monitor a poured state of the liquid in observation extending over a long term, a favorable poured state of the liquid is automatically maintained and a good fluorescent image can be obtained.

Thus, in the method of imaging fluorescence in the first aspect, it is desirable that the time until the liquid between the top portion of the immersion objective and the preset well, poured at the liquid pouring step S2, evaporates to reach an uncharged state is previously set as the preset time intervals at the repeated control step S4.

Second Aspect

Figure 3:
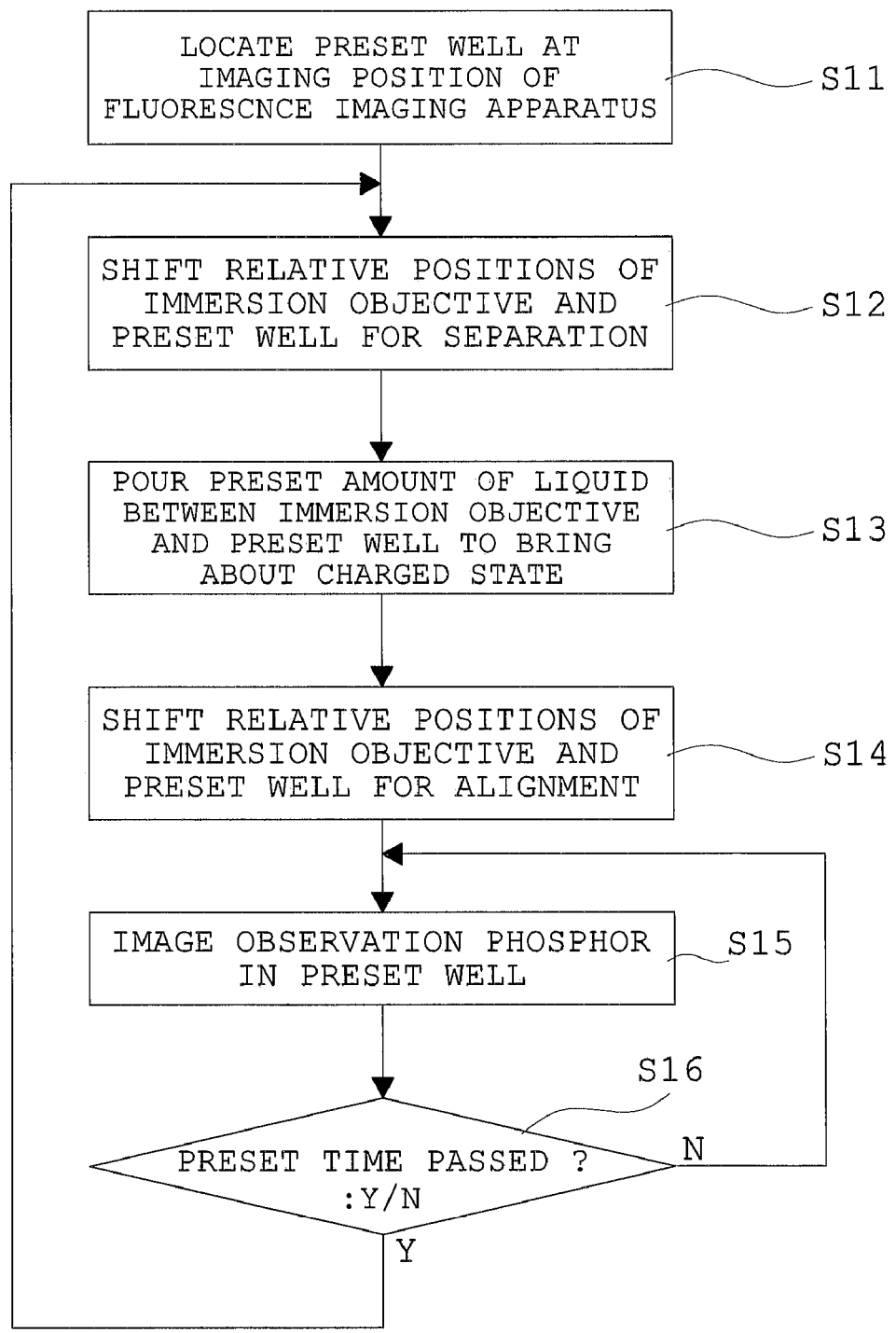
FIG. 3 is a flow chart illustrating the imaging procedure of the method of imaging fluorescence in a second aspect of the present invention.

FIG. 3 is a flow chart illustrating the imaging procedure of the method of imaging fluorescence in the second aspect of the present invention.

The method of imaging fluorescence in the second aspect includes an imaging position locating step S11, a shift step S12, a liquid pouring step S13, an alignment step S14, an imaging step S15, and a repeated control step S16.

At the imaging position locating step S11, like the imaging position locating step S1 in the method of imaging fluorescence of the first aspect, a preset well in a vessel having a plurality of wells in which observation phosphors are incorporated is located at the imaging position of the fluorescence imaging apparatus.

At the shift step S12, the relative positions of the immersion objective and the preset well are shifted so as to separate the immersion objective from the preset well.

At the liquid pouring step S13, like the liquid pouring step S2 in the method of imaging fluorescence of the first aspect, a preset amount of liquid is poured between the top portion of the immersion objective in the fluorescence imaging apparatus and the preset well incorporating the observation phosphor to bring about a charged state. At the alignment step S14, the relative positions of the immersion objective and the preset well are shifted so as to align the immersion objective with the observation phosphor in the preset well.

At the imaging step S15, like the imaging step S3 in the method of imaging fluorescence of the first aspect, the observation phosphor in the preset well where the space between the top portion of the immersion objective and this well is charged with the liquid is imaged.

At the repeated control step S16, a series of operations including the shift step S12 of a single operation, the liquid pouring step S13 of a single operation performed after the shift step S12 of the single operation, the alignment step S14 of a single operation performed after the liquid pouring step S13 of the single operation, and the imaging step S15 of a preset number of times of operations performed after the alignment step S14 of the single operation, are repeated at preset time intervals.

According to the method of imaging fluorescence in the second aspect, this method includes the shift S12 of shifting the relative positions of the immersion objective and the preset well so as to separate the immersion objective from the preset well, before the liquid pouring step S13, and the alignment step S14 of shifting the relative positions of the immersion objective and the preset well are shifted so as to align the immersion objective with the observation phosphor in the preset well, between the liquid pouring step S13 and the imaging step S15, and at the repeated control step S16, a series of operations including the shift step S12 of a single operation, the liquid pouring step S13 of a single operation performed after the shift step S12 of the single operation, the alignment step S14 of a single operation performed after the liquid pouring step S13 of the single operation, and the imaging step S115 of a preset number of times of operations performed after the alignment step S14 of the single operation, are repeated. Hence, even though the viewer does not monitor a poured state of the liquid in observation extending over a long term, a favorable poured state of the liquid is automatically maintained and a good fluorescent image can be obtained. In addition, nearly all operations required to obtain a fluorescent image can be automatically performed and the operation load of the viewer can be reduced to a minimum.

Also, at the shift step S12, it is desirable that the relative positions of the immersion objective and the preset well are shifted in a direction, at least, perpendicular to the optical axis of the immersion objective.

Thus, the liquid pouring means is made movable independently of the immersion objective so that the liquid is poured on the top lens surface of the immersion objective from the upper side of the immersion objective at a distance from the imaging position, and thereby the top portion of the liquid pouring means becomes hard to interfere with the immersion objective and a stage on which the specimen is placed. When the immersion objective is exchanged in accordance with the application of observation or even when the relative positions of the stage and the immersion objective are shifted, the top portion of the liquid pouring means does not collide with the immersion objective or the stage and can be maintained at a correct liquid pouring position to pour the liquid. Consequently, the optimum amount of liquid can be poured between the specimen and the immersion objective, and a high degree of accuracy of observation can be maintained.

Further, the top portion of the liquid pouring means is constructed to be movable independently of the immersion objective and thereby, for example, even when a plurality of immersion objectives are arranged in an objective switching device such as a revolver and used, the top lens surface of an individual switched immersion objective can be aligned with the top portion of the liquid pouring means. Consequently, liquid pouring tubes corresponding to the immersion objectives become unnecessary and it is avoidable that a space for placing the liquid pouring means is insufficient.

Moreover, the top portion of the liquid pouring means is constructed to be movable independently of the immersion objective and thereby the immersion objective is removed from the objective switching device such as the revolver and can be easily replaced with another immersion objective or an objective lens.

Third Aspect

Figure 4:
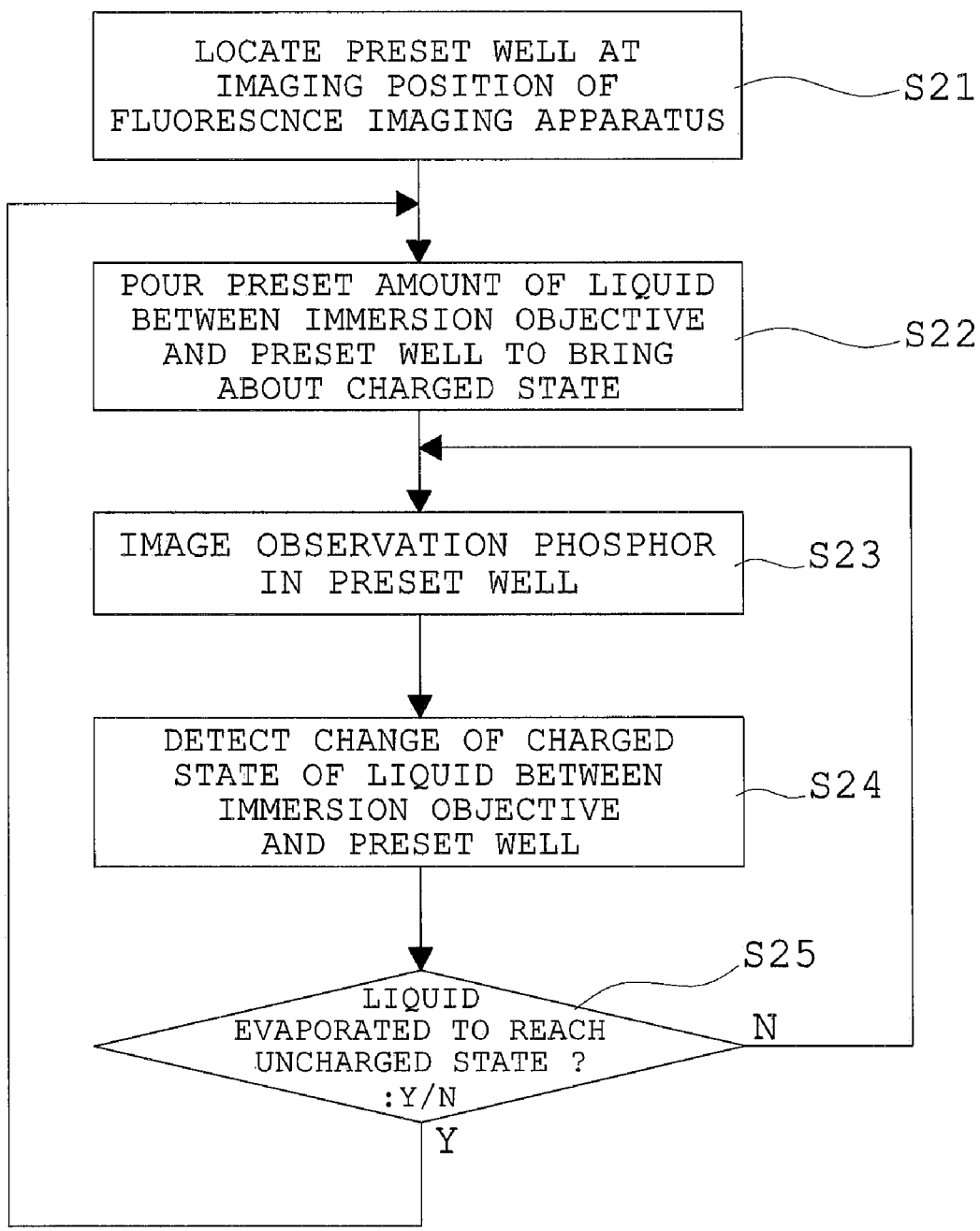
FIG. 4 is a flow chart illustrating the imaging procedure of the method of imaging fluorescence in a third aspect of the present invention.

FIG. 4 is a flow chart illustrating the imaging procedure of the method of imaging fluorescence in the third aspect of the present invention.

The method of imaging fluorescence in the third aspect, in which an inverted fluorescence imaging apparatus provided with an immersion objective is used to image an observation phosphor for a constant term, comprises an imaging position locating step S21, a liquid pouring step S22, an imaging step S23, a detection step S24, and a repeated control step S25.

At the imaging position locating step S21, like the imaging position locating step S1 in the method of imaging fluorescence of the first aspect, a preset well in a vessel having a plurality of wells in which observation phosphors are incorporated is located at the imaging position of the fluorescence imaging apparatus.

At the liquid pouring step S22, like the liquid pouring step S2 in the method of imaging fluorescence of the first aspect, a preset amount of liquid is poured between the top portion of the immersion objective in the fluorescence imaging apparatus and the preset well incorporating the observation phosphor to bring about a charged state.

At the imaging step S23, like the imaging step S3 in the method of imaging fluorescence of the first aspect, the observation phosphor in the preset well where the space between the top portion of the immersion objective and this well is charged with the liquid is imaged.

At the detection step S24, a change of the charged state of the liquid between the top portion of the immersion objective and the preset well, poured at the liquid pouring step S22, is detected.

At the repeated control step S25, when it is detected through the detection step S24 that the liquid between the top portion of the immersion objective and the preset well evaporates to reach an uncharged state, a series of operations including the liquid pouring step S22 of a single operation and the imaging step S23 of a preset number of times of operations performed after the liquid pouring step S22 of the single operation, are repeated.

According to the method of imaging fluorescence in the third aspect, this method is designed so that when it is detected at the detection step S24 that the liquid between the top portion of the immersion objective and the preset well, poured through the liquid pouring step S22, evaporates to reach an unchanged state and when it is detected through the detection step S24 at the repeated control step S25 that the liquid between the top portion of the immersion objective and the preset well evaporates to reach an unchanged state, a series of operations including the liquid pouring step S22 of a single operation and the imaging step S23 of a preset number of times of operations performed after the liquid pouring step S22 of the single operation, are repeated at preset time intervals. Hence, even though the viewer does not monitor a poured state of the liquid in observation extending over a long term, a favorable poured state of the liquid is automatically maintained and a good fluorescent image can be obtained.

Fourth Aspect

Figure 5:
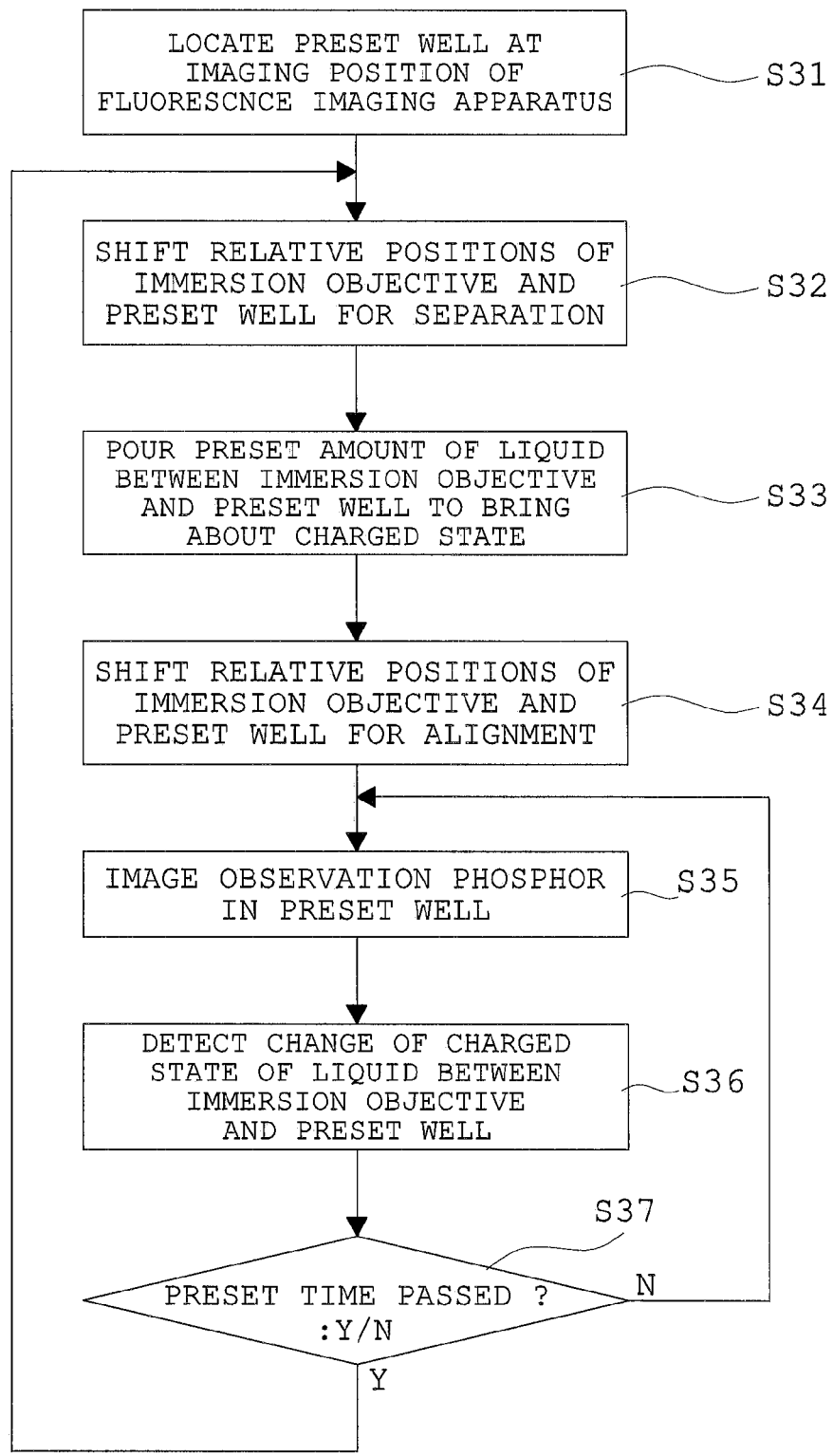
FIG. 5 is a flow chart illustrating the imaging procedure of the method of imaging fluorescence in a fourth aspect of the present invention.

FIG. 5 is a flow chart illustrating the imaging procedure of the method of imaging fluorescence in the fourth aspect of the present invention.

The method of imaging fluorescence in the fourth aspect includes an imaging position locating step S31, a shift step S32, a liquid pouring step S33, an alignment step S34, an imaging step S35, a detection step S36, and a repeated control step S37.

At the imaging position locating step S31, like the imaging position locating step S1 in the method of imaging fluorescence of the first aspect, a preset well in a vessel having a plurality of wells in which observation phosphors are incorporated is located at the imaging position of the fluorescence imaging apparatus.

At the shift step S32, like the shift step S12 in the method of imaging fluorescence of the second aspect, the relative positions of the immersion objective and the preset well are shifted so as to separate the immersion objective from the preset well.

At the liquid pouring step S33, like the liquid pouring step S2 in the method of imaging fluorescence of the first aspect, a preset amount of liquid is poured between the top portion of the immersion objective in the fluorescence imaging apparatus and the preset well incorporating the observation phosphor to bring about a charged state.

At the alignment step S34, like the alignment S14 in the method of imaging fluorescence of the second aspect, the relative positions of the immersion objective and the preset well are shifted so as to align the immersion objective with the observation phosphor in the preset well.

At the imaging step S35, like the imaging step S3 in the method of imaging fluorescence of the first aspect, the observation phosphor in the preset well where the space between the top portion of the immersion objective and this well is charged with the liquid is imaged.

At the detection step S36, like the detection step S24 in the method of imaging fluorescence of the third aspect, a change of the charged state of the liquid between the top portion of the immersion objective and the preset well, poured at the liquid pouring step S33, is detected.

At the repeated control step S37, when it is detected through the detection step S36 that the liquid between the top portion of the immersion objective and the preset well evaporates to reach an uncharged state, a series of operations including the shift step S32 of a single operation, the liquid pouring step S33 of a single operation performed after the shift step S32 of the single operation, the alignment step S34 of a single operation performed after the liquid pouring step S33 of the single operation, and the imaging step S35 of a preset number of times of operations performed after the alignment step S34 of the single operation, are repeated.

According to the method of imaging fluorescence in the fourth aspect, this method includes the shift step S32 of shifting the relative positions of the immersion objective and the preset well so as to separate the immersion objective from the preset well before the liquid pouring step S33 and the alignment step S34 of shifting the relative positions of the immersion objective and the preset well so as to align the immersion objective with the observation phosphor in the preset well between the liquid pouring step S33 and the imaging step S35, and at the repeated control step S37, when it is detected through the detection step S36 that the liquid between the top portion of the immersion objective and the preset well evaporates to reach an uncharged state, a series of operations including the shift step S32 of a single operation, the liquid pouring step S33 of a single operation performed after the shift step S32 of the single operation, the alignment step S34 of a single operation performed after the liquid pouring step S33 of the single operation, and the imaging step S35 of a preset number of times of operations performed after the alignment step S34 of the single operation, are repeated. Hence, even though the viewer does not monitor a poured state of the liquid in observation extending over a long term, a favorable poured state of the liquid is automatically maintained and a good fluorescent image can be obtained. In addition, nearly all operations required to obtain a fluorescent image can be automatically performed and the operation load of the viewer can be reduced to a minimum.

Also, even in the method of imaging fluorescence of the fourth aspect, like the method of imaging fluorescence of the third aspect, it is desirable that at the shift step S32, the relative positions of the immersion objective and the vessel are shifted, at least, in a direction perpendicular to the optical axis of the immersion objective.

Thus, like the method of imaging fluorescence of the third aspect, the liquid pouring means is made movable independently of the immersion objective so that the liquid is poured on the top lens surface of the immersion objective from the upper side of the immersion objective at a distance from the imaging position, and thereby the top portion of the light pouring means becomes hard to interfere with the immersion objective and a stage on which the specimen is placed. When the immersion objective is exchanged in accordance with the application of observation or even when the relative positions of the stage and the immersion objective are shifted, the top portion of the liquid pouring means does not collide with the immersion objective or the stage and can be maintained at a correct liquid pouring position to pour the liquid. Consequently, the optimum amount of liquid can be poured between the specimen and the immersion objective, and a high degree of accuracy of observation can be maintained.

Further, the top portion of the liquid pouring means is constructed to be movable independently of the immersion objective and thereby, for example, even when a plurality of immersion objectives are arranged in an objective switching device such as a revolver and used, the top lens surface of an individual switched immersion objective can be aligned with the top portion of the liquid pouring means. Consequently, liquid pouring tubes corresponding to the immersion objectives become unnecessary and it is avoidable that a space for placing the liquid pouring means is insufficient.

Moreover, the top portion of the liquid pouring means is constructed to be movable independently of the immersion objective and thereby the immersion objective is removed from the objective switching device such as the revolver and can be easily replaced with another immersion objective or an objective lens.

Fifth Aspect

Figure 6:
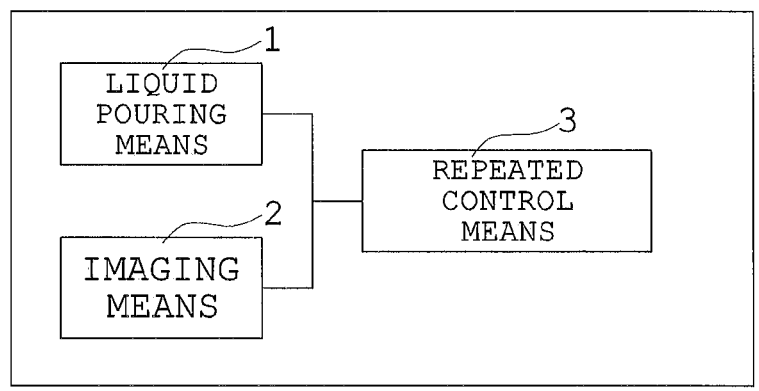
FIG. 6 is a block diagram showing essential parts of the structure of the fluorescence imaging apparatus in a fifth aspect of the present invention.

FIG. 6 is a block diagram showing essential parts of the structure of the fluorescence imaging apparatus in the fifth aspect of the present invention.

The fluorescence imaging apparatus of the fifth aspect is constructed as an inverted fluorescence microscope provided with an immersion objective (not shown in the figure) in which an observation phosphor is observed for a constant term, and has a liquid pouring means 1, an imaging means 2, and a repeated control means 3.

The liquid pouring means 1 is constructed so that a preset amount of liquid is poured between the top portion of the immersion objective and a preset well in a vessel having a plurality of wells in which observation phosphors (not shown) are incorporated.

The imaging means 2 is constructed so that the observation phosphor in the preset well is imaged in a state where the space between the top portion of the immersion objective and the preset well is charged with the liquid.

The repeated control means 3 is constructed to control the liquid pouring means 1 and the imaging means 2 in such a way that a series of operations including single operation that the liquid is poured between the top portion of the immersion objective and the preset well by the liquid pouring means 1 and a preset number of times of operations that the observation phosphor is imaged by the imaging means 2 are repeated at preset time intervals.

According to the fluorescence imaging apparatus of the fifth aspect, the method of imaging fluorescence of the first aspect shown in the flow chart of FIG. 2 can be followed, and the same effect as in the method of imaging fluorescence of the first aspect is obtained.

Sixth Aspect

Figure 7:
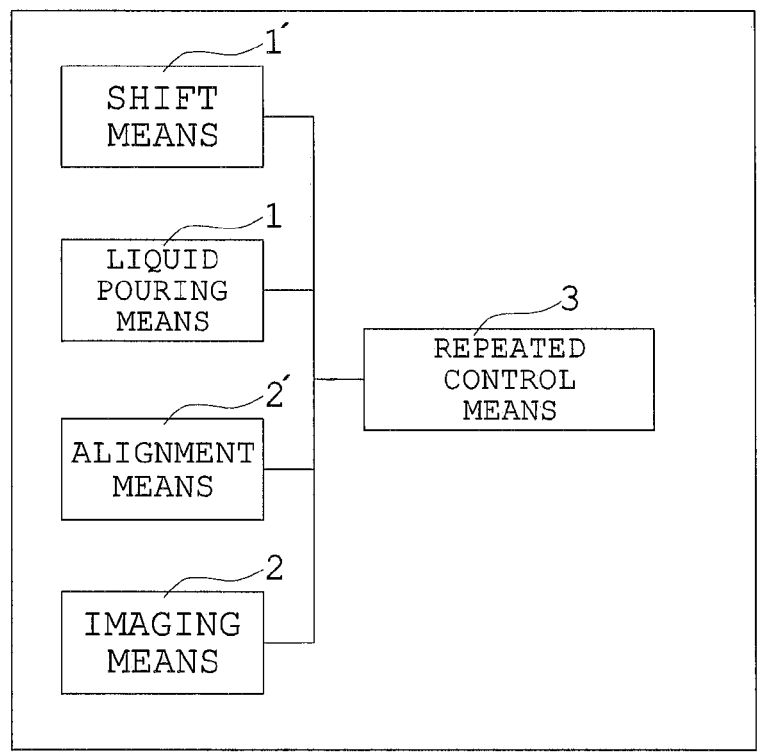
FIG. 7 is a block diagram showing essential parts of the structure of the fluorescence imaging apparatus in a sixth aspect of the present invention.

FIG. 7 is a block diagram showing essential parts of the structure of the fluorescence imaging apparatus in the sixth aspect of the present invention.

The fluorescence imaging apparatus of the sixth aspect is constructed as an inverted fluorescence microscope provided with an immersion objective (not shown in the figure) in which an observation phosphor is observed for a constant term, and has a shift means 1', the liquid pouring means 1, an alignment means 2', the imaging means 2, and the repeated control means 3.

The liquid pouring means 1 and the imaging means 2 are constructed like the liquid pouring means 1 and the imaging means 2, respectively, of the fluorescence imaging apparatus of the fifth aspect.

The shift means 1' is constructed so that the relative positions of the immersion objective and the preset well incorporating the observation phosphor (not shown) are shifted to separate the immersion objective from the preset well.

The alignment means 2' is constructed so that the relative positions of the immersion objective and the preset well are shifted to align the immersion objective with the observation phosphor in the preset well.

The repeated control means 3 is constructed to control the shift means 1', the liquid pouring means 1, the alignment means 2', and the imaging means 2 in such a way that a series of operations including a single operation that the relative positions of the immersion objective and the preset well are shifted by the shift means 1', a single operation that the liquid is poured between the top portion of the immersion objective and the preset well by the liquid pouring means 1, a single operation that the immersion objective is aligned with the observation phosphor in the preset well by the alignment means 2', and a preset number of times of operations that the observation phosphor is imaged by the imaging means 2 are repeated at preset time intervals.

According to the fluorescence imaging apparatus of the sixth aspect, the method of imaging fluorescence of the second aspect shown in the flow chart of FIG. 3 can be followed, and the same effect as in the method of imaging fluorescence of the second aspect is obtained.

Seventh Aspect

Figure 8:
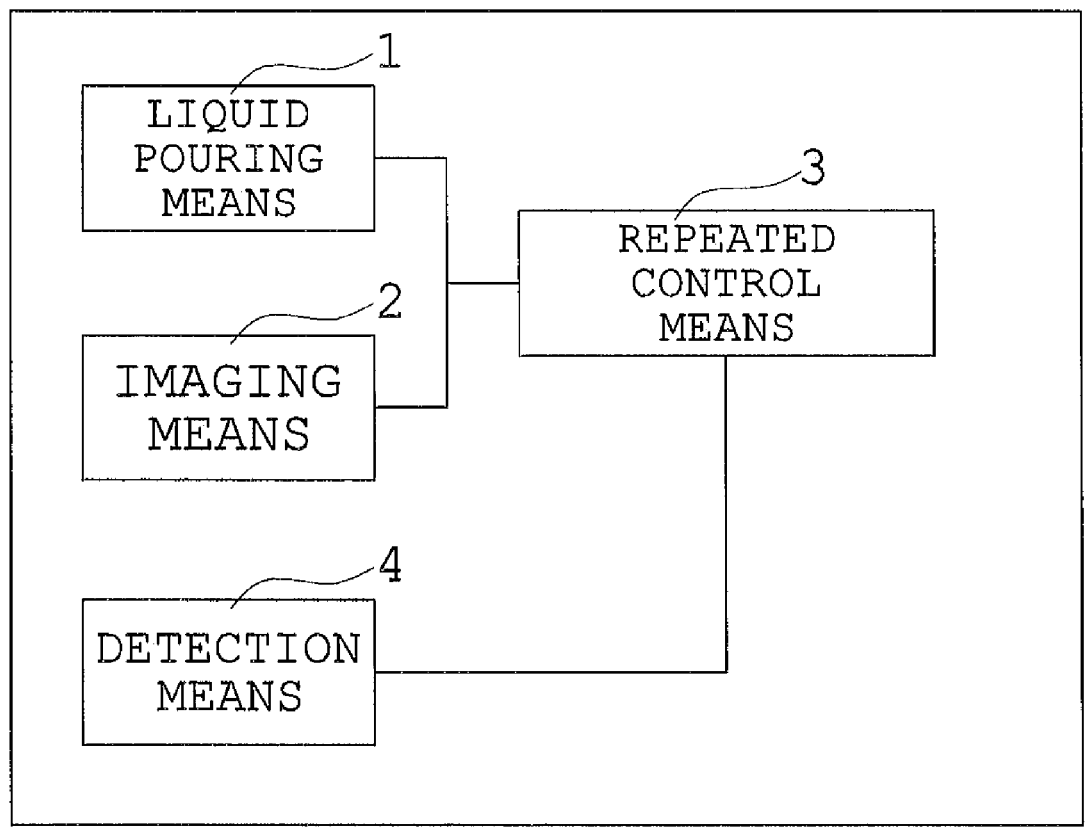
FIG. 8 is a block diagram showing essential parts of the structure of the fluorescence imaging apparatus in a seventh aspect of the present invention.

FIG. 8 is a block diagram showing essential parts of the structure of the fluorescence imaging apparatus in the seventh aspect of the present invention.

The fluorescence imaging apparatus of the seventh aspect is constructed as an inverted fluorescence microscope provided with an immersion objective (not shown in the figure) in which an observation phosphor is observed for a constant term, and has the liquid pouring means 1, the imaging means 2, a detection means 4, and the repeated control means 3.

The liquid pouring means 1 and the imaging means 2 are constructed like the liquid pouring means 1 and the imaging means 2, respectively, of the fluorescence imaging apparatus of the fifth aspect.

The detection means 4 is constructed so that a change of the charged state of the liquid between the top portion of the immersion objective and the preset well incorporating the observation phosphor (not shown) is detected.

The repeated control means 3 is constructed so that when it is detected through the detection means 4 that the liquid between the top portion of the immersion objective and the preset well evaporates to reach the uncharged state, the liquid pouring means 1 and the imaging means 2 are controlled in such a way as to repeat a series of operations including a single operation that the liquid is poured between the top portion of the immersion objective and the preset well by the liquid pouring means 1 and a preset number of times of operations that the observation phosphor is imaged by the imaging means 2.

According to the fluorescence imaging apparatus of the seventh aspect, the method of imaging fluorescence of the third aspect shown in the flow chart of FIG. 4 can be followed, and the same effect as in the method of imaging fluorescence of the third aspect is obtained.

Eighth Aspect

Figure 9:
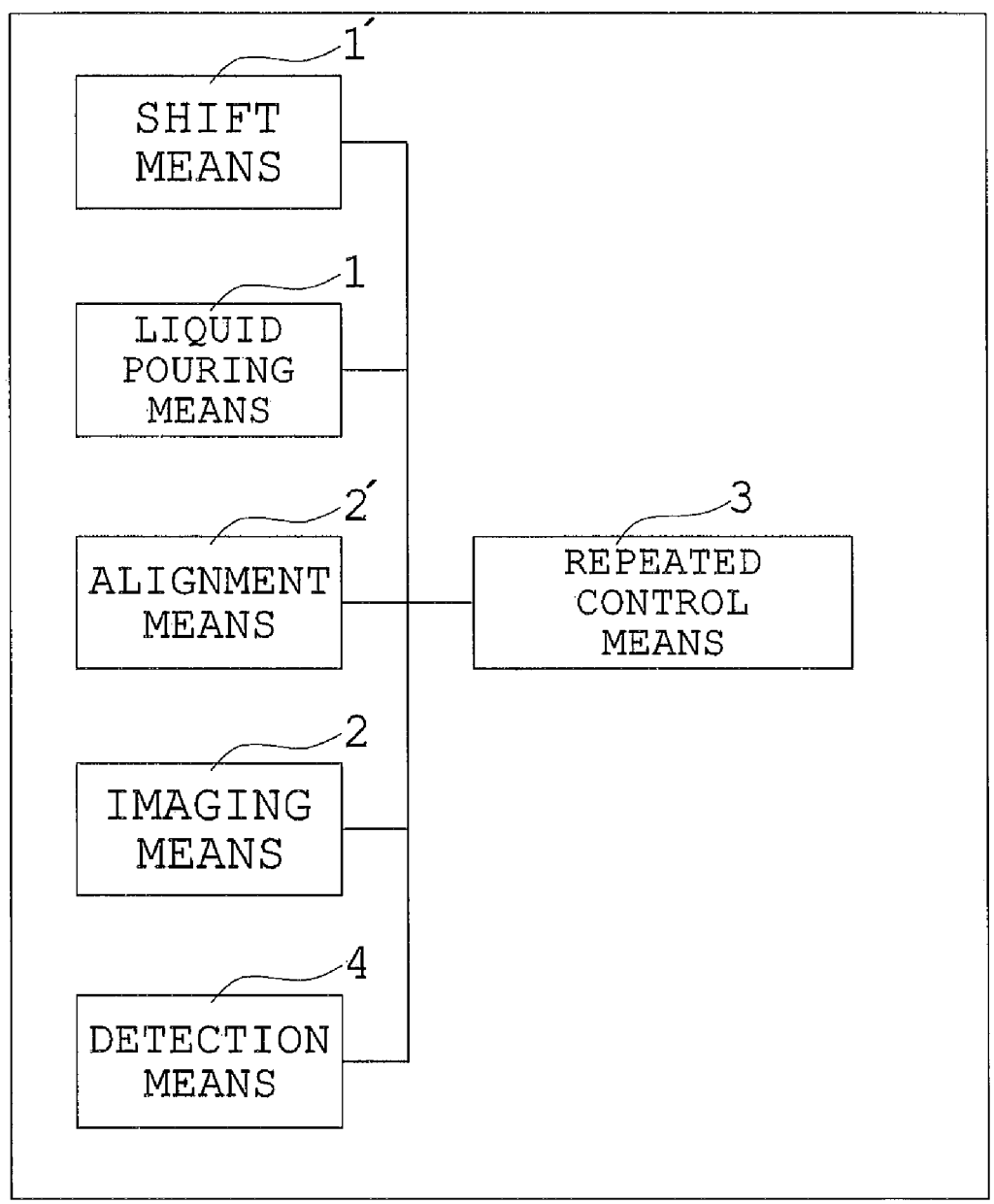
FIG. 9 is a block diagram showing essential parts of the structure of the fluorescence imaging apparatus in an eighth aspect of the present invention.

FIG. 9 is a block diagram showing essential parts of the structure of the fluorescence imaging apparatus in the eighth aspect of the present invention.

The fluorescence imaging apparatus of the eighth aspect is constructed as an inverted fluorescence microscope provided with an immersion objective (not shown in the figure) in which an observation phosphor is observed for a constant term, and has the shift means 1', the liquid pouring means 1, the alignment means 2', the imaging means 2, the detection means 4, and the repeated control means 3.

The liquid pouring means 1 and the imaging means 2 are constructed like the liquid pouring means 1 and the imaging means 2, respectively, of the fluorescence imaging apparatus of the fifth aspect.

The shift means 1' and the alignment means 2' are constructed like the shift means 1' and the alignment means 2', respectively, of the fluorescence imaging apparatus of the sixth aspect.

The repeated control means 3 is constructed so that when it is detected through the detection means 4 that the liquid between the top portion of the immersion objective and the preset well incorporating the observation phosphor (not shown) evaporates to reach the uncharged state, the shift means 1', the liquid pouring means 1, the alignment means 2', and the imaging means 2 are controlled in such a way as to repeat a series of operations including a single operation that the relative positions of the immersion objective and the preset well are shifted by the shift means 1', a single operation that the liquid is poured between the top portion of the immersion objective and the preset well by the liquid pouring means 1, a single operation that the immersion objective is aligned with the observation phosphor in the preset well by the alignment means 2', and a preset number of times of operations that the observation phosphor is imaged by the imaging means 2.

According to the fluorescence imaging apparatus of the eighth aspect, the method of imaging fluorescence of the fourth aspect shown in the flow chart of FIG. 5 can be followed, and the same effect as in the method of imaging fluorescence of the fourth aspect is obtained.

Also, each of the aspects mentioned above has been described by using the preset well in a vessel (a multiple-well plate) having a plurality of wells as the vessel incorporating the observation phosphors. However, any vessel in which the observation phosphors are incorporated and can be observed, for example, a culture vessel, may be used.

Further, each aspect mentioned above is such that, after one well is observed, the observation of another well is carried out. In the present invention, however, each aspect may be applied to the case where only one well is observed for preset time. Moreover, it may be applied to the case where a plurality of preset positions in one well are observed at preset time intervals.

In accordance with the drawings, the embodiments of the fluorescence imaging apparatus applying the method of imaging fluorescence and the structure of the fluorescence imaging apparatus in the aspects mentioned above will be explained below.

Embodiment 1

Figure 10:
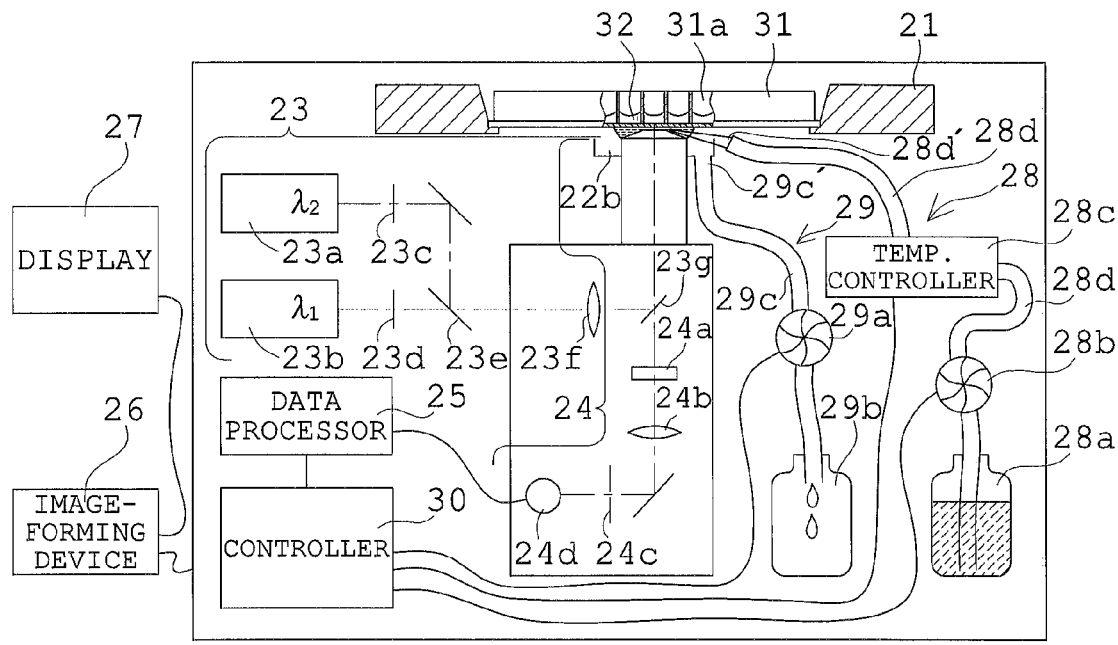
FIG. 10 is a conceptual view showing the entire structure of the fluorescence imaging apparatus in Embodiment 1 of the present invention.
Figure 11:
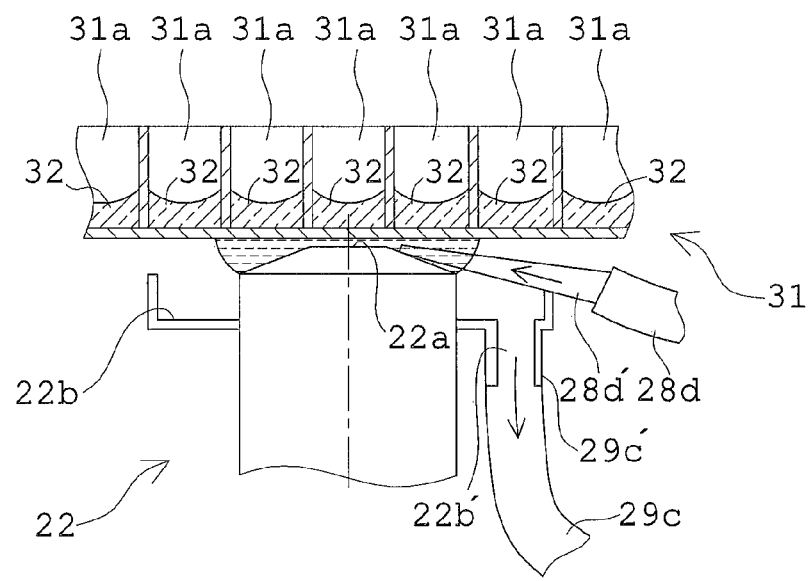
FIG. 11 is a partially enlarged view of FIG. 10.
Figure 12:
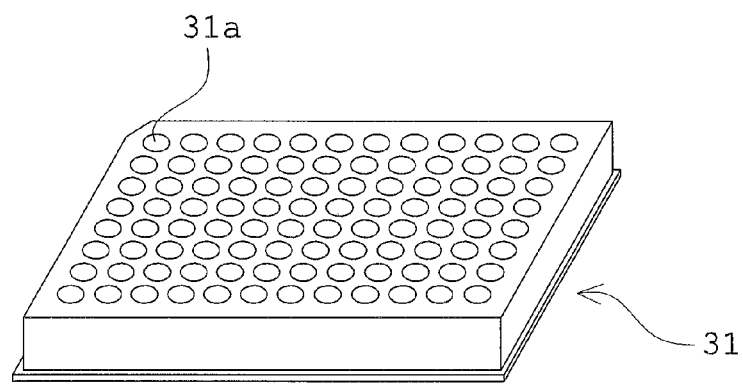
FIG. 12 is an explanatory view showing the appearance of a specimen vessel used in the fluorescence imaging apparatus of FIG. 10.

FIG. 10 shows the entire structure of the fluorescence imaging apparatus in Embodiment 1 of the present invention. FIG. 11 is a partially enlarged view of FIG. 10. FIG. 12 shows the appearance of a specimen vessel used in the fluorescence imaging apparatus of FIG. 10.

The fluorescence imaging apparatus of Embodiment 1 is constructed as an inverted microscope provided with an immersion objective in which an observation phosphor is observed for a constant term.

The inverted microscope has a stage 21 on which an observation object is placed at an observation position; an immersion objective 22 placed below the stage 21; an illumination means 23 illuminating the observation object with light of a preset excitation wavelength; an imaging means 24 imaging desired fluorescence from the illuminated observation object; a processing means (a data processor) 25 processing the fluorescence imaged by the imaging means 24; an image-forming means (an image-forming device) 26 forming an image in accordance with information processed by the processing means 25; an image display means (a display) 27 displaying an image formed by the image-forming means 26; a liquid pouring means 28 pouring a liquid on the immersion objective 22; a discharge means 29 discharging the liquid poured on the immersion objective 22; and a control means 30 carrying out preset control.

At the observation position of the stage 21, a plate 31 provided with a large number of wells 31*a* is placed as a specimen vessel. Each of the wells 31*a* incorporates a specimen 32 as the observation object.

The illumination means 23 is constructed with illumination light sources 23*a* and 23*b*, each emitting light of a different excitation wavelength; excitation filters 23*c* and 23*d*; a path combining means 23*e*; an illumination lens 23*f*; a dichroic mirror 23*g*; and the immersion objective 22.

The imaging means 24 has the immersion objective 22, the dichroic mirror 23*g*, a band-pass filter 24*a*, an imaging lens 24*b*, a confocal aperture 24*c*, and an image sensor 24*d*. As the image sensor 24*d*, for example, a CCD can be used.

On the periphery of the objective 22 is provided a liquid receiving portion 22*b* which is configured with an annular groove for storing the liquid flowing from a top lens surface 22*a* of the objective 22.

The liquid pouring means 28 has a receptacle 28*a* for the liquid to be poured as a medium interposed between the specimen 32 and the immersion objective 22, a pump 28*b* feeding the liquid admitted to the receptacle 28*a* in a direction in which the liquid is poured, a temperature controller 28*c* controlling the temperature of the liquid, and a liquid pouring tube 28*d* through which the liquid to be poured passes. Also, the liquid pouring means 28 may be constructed not to have the temperature controller 28*c*.

The discharge means 29 has a pump 29*a* feeding the liquid stored in the liquid receiving portion 22*b* of the immersion objective 22 in a direction in which the liquid is discharged, a receptacle 29*b* storing a discharged liquid, and a discharge tube 29*c* through which the liquid to be discharged passes.

The control means 30 is connected to the data processor 25, the pump 28*b*, the temperature controller 28*c*, and the pump 29*a*. The control means 30 is constructed to send a control signal for performing preset processing relative to observation information imaged by the image sensor 24*d* with respect to the data processor 25, a preset control signal for drawing up the liquid stored in the receptacle 28*a* by a preset amount with respect to the pump 28*b*, a control signal for adjusting the temperature of the liquid to a preset temperature with respect to the temperature controller 28*c*, and a control signal for discharging the liquid by a preset amount with respect to the pump 29*a*.

The control means 30 has the function of controlling the imaging means 24 and the liquid pouring means 28 in such a way that a series of operations including a single operation that the liquid is poured between the top lens surface 22*a* of the immersion objective 22 and the preset well 31*a* by the liquid pouring means 28 and a preset number of times of operations that the specimen 32 placed as the observation phosphor is imaged by the imaging means 24, are repeated at preset time intervals.

Also, the preset time intervals are previously set as time until the liquid between the top lens surface 22*a* of the immersion objective 22 and the preset well 31*a*, poured through the liquid pouring means 28, evaporates to reach an uncharged state.

The fluorescence imaging apparatus of Embodiment 1, as shown in FIG. 11 of the enlarged view, is constructed so that a top portion 28*d'* of the liquid pouring tube 28*d* as a liquid pouring section in the liquid pouring means 28 is fixed to the liquid receiving portion 22*b* of the immersion objective 22 and is shaped like a nozzle that extends to reduce in diameter from the side of the immersion objective 22 toward the proximity of the top lens surface 22*a* of the immersion objective 22, and the liquid is poured from the side of the top lens surface 22*a* through the tip of the nozzle.

A top portion 29*c'* of the discharge tube 29*c* of the discharge means 29 is fixed to a discharge port 22*b'* of the liquid receiving portion 22*b* of the immersion objective 22 so that the liquid stored in the liquid receiving portion 22*b* of the immersion objective 22 flows through the top portion 29*c'* of the discharge tube 29*c* and is discharged through the discharge port 22*b'*.

The fluorescence imaging apparatus of Embodiment 1, as mentioned above, has the structure that the liquid pouring means 28, the imaging means 24, and the control means 30 correspond to the liquid poring means 1, the imaging means 2, and the repeated control means 3, respectively, in the fluorescence imaging apparatus of the fifth aspect shown in FIG. 6 so that the same steps as in the method of imaging fluorescence of the first aspect shown in the flow chart of FIG. 2 can be followed.

Also, in the illumination means 23, any structure that the observation object can be illuminated with excitation light of a preset wavelength through the immersion objective 22 is applicable.

Further, in the imaging means 14, any structure that the observation phosphor in the preset well 31*a* can be imaged in a state where the space between the top lens surface 22*a* of the immersion objective 22 and the preset well 31*a* incorporating the specimen 32 of the observation phosphor is charged with the liquid is applicable.

In addition, although the fluorescence imaging apparatus of Embodiment 1 has the illumination means 23, the imaging means 24, the processing means 25, the image-forming means 26, and the image display means 27, any structure that the same construction as in the fluorescence imaging apparatus of the fifth aspect is provided, the same steps as in the method of imaging fluorescence of the first aspect shown in the flow chart of FIG. 2 can be followed, and the function of the inverted microscope provided with the immersion objective 22 is performed is applicable.

According to the fluorescence imaging apparatus of Embodiment 1 constructed as mentioned above, the method of imaging fluorescence of the first aspect shown in the flow chart of FIG. 2 can be followed, and at the repeated control step S4, a series of operations including the liquid pouring step S2 of a single operation and the imaging step S3 of a preset number of times of operations performed after the liquid pouring step S2 of the single operation can be repeated at preset time intervals until the liquid between the top lens surface 22*a* of the immersion objective 22 and the preset well 31*a*, poured at the liquid pouring step S2, evaporates to reach the uncharged state. Hence, even though the viewer does not monitor the poured state of the liquid in observation extending over a long term, a favorable poured state of the liquid is automatically maintained and a good fluorescent image can be obtained.

Also, as an modified example of the fluorescence imaging apparatus of Embodiment 1, the apparatus may be constructed so that when a detection means (not shown) detecting a change of the charged state of the liquid between the top lens surface 22a of the immersion objective 22 and the preset well 31a is provided and it is detected through the detection means that the liquid between the top lens surface 22a of the immersion objective 22 and the preset well 31a evaporates to reach the uncharged state, the control means 30 controls the liquid pouring means 28 and the imaging means 24 in such a way as to repeat a series of operations including a single operation that the liquid is poured between the top lens surface 22a of the immersion objective 22 and the preset well 31a by the liquid pouring means 28 and a preset number of times of operations that the specimen 32 placed as the observation phosphor is imaged by the imaging means 24, and the liquid pouring means 28, the imaging means 24, the detection means (not shown), and the control means 30 correspond to the liquid pouring means 1, the imaging means 2, the detection means 4, and the repeated control means 3, respectively, in the fluorescence imaging apparatus of the seventh aspect shown in FIG. 8 to enable the same steps as in the method of imaging fluorescence of the third aspect shown in the flow chart of FIG. 4 to be followed.

Also, in the detection means, any structure that the change of the charged state of the liquid between the top lens surface 22a of the immersion objective 22 and the preset well 31a can be detected may be used.

According to the fluorescence imaging apparatus of the modified example of Embodiment 1, like the fluorescence imaging apparatus of Embodiment 1, even though the viewer does not monitor the poured state of the liquid in observation extending over a long term, a favorable poured state of the liquid is automatically maintained and a good fluorescent image can be obtained.

Embodiment 2

Figure 13:
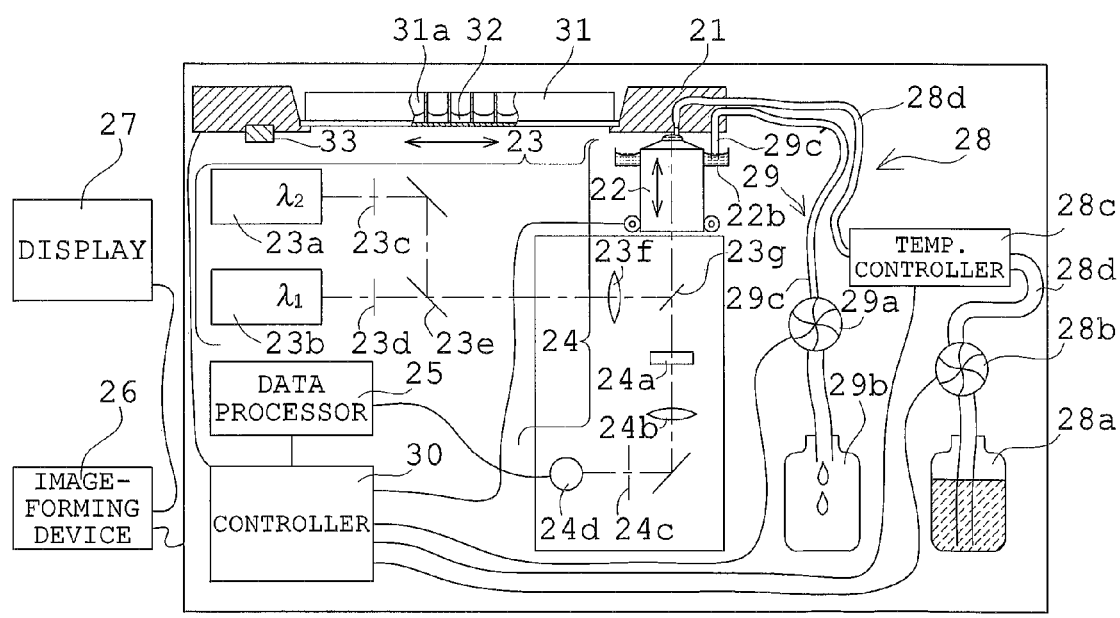
FIG. 13 is a conceptual view showing the entire structure of the fluorescence imaging apparatus in Embodiment 2 of the present invention.
Figure 14:
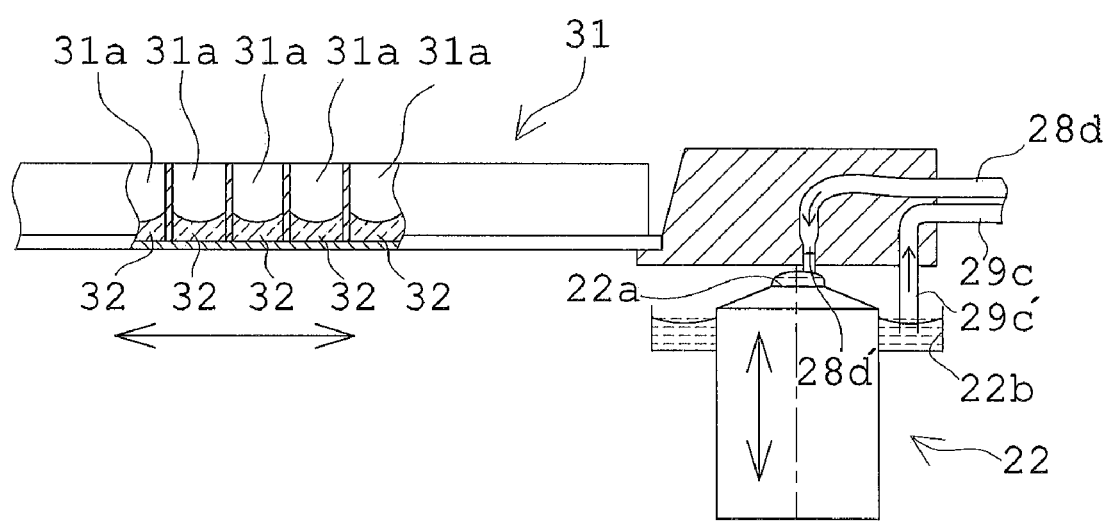
FIG. 14 is a partially enlarged view of FIG. 13.

FIG. 13 shows the entire structure of the fluorescence imaging apparatus in Embodiment 2 of the present invention. FIG. 14 is a partially enlarged view of FIG. 13. Also, like numerals are used for like elements with respect to the fluorescence imaging apparatus of Embodiment 1 shown in FIG. 10 and their detailed explanation is omitted.

The fluorescence imaging apparatus of Embodiment 2, as shown in FIG. 14 of the enlarged view, is constructed so that the liquid pouring tube 28d is fixed to the stage 21 in a state where the liquid pouring tube 28d passes through the inside of a part spaced away from the observation position of the stage 21 and the top portion 28d' extends perpendicular to the lower surface of the stage 21, the top portion 28d' of the liquid pouring tube 28d is movable independently of the immersion objective 22, and the liquid can be poured on the top lens surface 22a of the immersion objective 22 from the upper side of the immersion objective 22 at a distance from the observation position of the stage 21.

In the fluorescence imaging apparatus of Embodiment 2, the controller 30 has a function as a position control means and is connected to the stage 21, the immersion objective 22, or a driving device of a supporting member (not shown) supporting the immersion objective 22, and a control signal for moving either the stage 21 or the immersion objective 22, or both, by preset amounts in horizontal and vertical directions is transmitted so that relative positions of the liquid pouring position (namely, the position of the top portion 28d' of the liquid pouring tube 28d) of the liquid pouring means 28 and the immersion objective 22 (more specifically, the top lens surface 22a) are thereby automatically aligned and at the same time, relative positions of the immersion objective 22 on which the liquid is poured by the liquid pouring means 28 and a desired observation position of the stage 21 can be automatically aligned.

The control means 30 is constructed to control the liquid pouring means 28 and the imaging means 24 in such a way that a series of operations including a single operation that the relative positions of the immersion objective 22 and the preset well 31a are shifted, a single operation that the liquid is poured between the top lens surface 22a of the immersion objective 22 and the preset well 31a by the liquid pouring means 28, a single operation that the immersion objective 22 is aligned with the specimen 32 placed as the observation phosphor in the preset well 31a, and a preset number of times of operations that the observation phosphor is imaged by the imaging means 24 are repeated at preset time intervals until the liquid between the top lens surface 22a of the immersion objective 22 and the preset well 31a, poured through the liquid pouring means 28, evaporates to reach the uncharged state.

The fluorescence imaging apparatus of Embodiment 2 is constructed so that the discharge tube 29c of the discharge means 29 is fixed to the stage 21 in a state where the discharge tube 29c passes through the inside of a part spaced away from the observation position of the stage 21 and the top portion 29c' extends perpendicular to the lower surface of the stage 21, and the top portion 29c' of the discharge tube 29c is movable independently of the immersion objective 22 and can be submerged perpendicular to the surface of the liquid stored in the liquid receiving portion 22b of the immersion objective 22 at a distance from the observation position of the stage 21 to pump up the liquid stored in the liquid receiving portion 22b. Specifically, the discharge means 29 is such that the liquid stored in the liquid receiving portion 22b is pumped up through the top portion 29c' of the discharge tube 29c.

In the fluorescence imaging apparatus of Embodiment 2, as described above, the control means 30 has the functions of the shift means 1' and the alignment means 2' in the fluorescence imaging apparatus of the sixth aspect shown in FIG. 7, and the liquid pouring means 28, the imaging means 24, and the control means 30 are constructed to correspond to the shift 1', the liquid pouring means 1, the alignment means 2', the imaging means 2, and the repeated control means 3 in the fluorescence imaging apparatus of the sixth aspect shown in FIG. 7 so that the same steps as in the method of imaging fluorescence of the second aspect shown in the flow chart of FIG. 3 can be followed.

According to the fluorescence imaging apparatus of Embodiment 2 constructed as mentioned above, the method of imaging fluorescence of the second aspect shown in the flow chart of FIG. 3 can be followed and at the repeated control step S116, a series of operations including the shift step S12 of a single operation, the liquid pouring step S13 of a single operation performed after the shift step S12 of the single operation, the alignment step S14 of a single operation performed after the liquid pouring step S13 of the single operation, and the imaging step S15 of a preset number of times of operations performed after the alignment step S14 of the single operation can be repeated at preset time intervals until the liquid between the top lens surface 22a of the immersion objective 22 and the preset well 31a, poured at the liquid pouring step S13, evaporates to reach the uncharged state. Hence, in addition to the fact that even though the viewer does not monitor the poured state of the liquid in observation extending over a long term, a favorable poured state of the liquid is automatically maintained and a good fluorescent image can be obtained, nearly all operations required to obtain a fluorescent image can be automatically performed and the operation load of the viewer can be reduced to a minimum.

Further, according to the fluorescence imaging apparatus of Embodiment 2, the apparatus is constructed so that the relative positions of the immersion objective 22 and the preset well 31a can be shifted in a direction perpendicular to the optical axis of the immersion objective 22 and the top portion 28d' of the liquid pouring tube 28d is movable independently of the immersion objective 22. Thus, for example, even when a plurality of immersion objectives 22 are arranged in an objective switching device such as a revolver and used, the top lens surface 22a of the individual switched immersion objective 22 can be aligned with the top portion 28d' of the liquid pouring tube 28d. Consequently, liquid pouring tubes corresponding to the immersion objectives 22 become unnecessary and the problem that a space for placing the liquid pouring tube is insufficient can be solved.

Moreover, when the top portion 28d' of the liquid pouring tube 28d is designed to be movable independently of the immersion objective 22, the immersion objective 22 is removed from the objective switching device such as the revolver and can be easily replaced with another immersion objective 22 or an objective lens.

According to the fluorescence imaging apparatus of Embodiment 2, in addition to the effects described above, the following effects are also obtained.

First of all, according to the fluorescence imaging apparatus of Embodiment 2, the controller 30 is such that the relative positions of the liquid pouring position (namely, the position of the top portion 28d' of the liquid pouring tube 28d) of the liquid pouring means 28 and the immersion objective 22 (more specifically, the top lens surface 22a) are automatically aligned as a position control means and at the same time, the relative positions of the immersion objective 22 on which the liquid is poured by the liquid pouring means 28 and a desired observation position of the stage 21 can be automatically aligned. Hence, the liquid pouring position can be always accurately aligned with the observation position without troubling an operator, and a high-precision observation can be carried out with respect to a desired specimen.

Further, according to the fluorescence imaging apparatus of Embodiment 2, the top portion 28d' of the liquid pouring tube 28d is constructed so that the liquid can be poured on the top lens surface 22a of the immersion objective 22 from the upper side of the immersion objective 22 at a distance from the observation position of the stage 21, and thus the top portion 28d' of the liquid pouring tube 28d does not interfere with the immersion objective 22 and the stage 21. When the immersion objective 22 is exchanged in accordance with the application of observation or even when the relative positions of the stage 21 and the immersion objective 22 are shifted, the top portion 28d' of the liquid pouring tube 28d does not collide with the immersion objective 22 or the stage 22 and can be maintained at a correct liquid pouring position to pour the liquid. Consequently, the optimum amount of liquid can be poured between the specimen 32 and the immersion objective 22, and a high-precision observation can be maintained.

Still further, according to the fluorescence imaging apparatus of Embodiment 2, the apparatus is constructed so that the top portion 29c' of the discharge tube 29c is movable independently of the immersion objective 22 and is capable of pumping up the liquid stored in the liquid receiving portion 22b at a distance from the observation position of the stage 21. Hence, as in the case where the top portion 28d' of the liquid pouring tube 28d is made movable independently of the immersion objective 22, interference with another member can be prevented and the immersion objective 22 can be exchanged without any problem.

Moreover, the fluorescence imaging apparatus of Embodiment 2 shown in FIG. 13, in contrast with the fluorescence imaging apparatus of Embodiment 1 in FIG. 10, is provided with a cleaning member 33 for cleaning the top lens surface 22a of the immersion objective 22 at a distance from the observation position on the lower surface of the stage 21. The control means 30 is also designed to have the function as a position control means in which the relative positions of the immersion objective 22 and the cleaning member 33 can be shifted so that the top lens surface 22a of the immersion objective 22 can be rubbed against the cleaning member 33.

The cleaning member 33 is constructed with a member having preset elasticity, for example, unwoven cloth, such that when the top lens surface 22a is rubbed, dirt particles adhering to the top lens surface 22a can be eliminated without damaging the top lens surface 22a.

Thus, according to the fluorescence imaging apparatus of Embodiment 2, in addition to being provided with the liquid pouring means 28 and the discharge means 29, the apparatus has the function of automatically shifting the relative positions of the immersion objective and the desired observation position so that even when it is difficult for the viewer to clean directly the immersion objective, the top lens surface 22a of the immersion objective 22 can be cleaned by the cleaning member 33 in shifting the relative positions of the stage 21 and the immersion objective 22. Consequently, even though the apparatus is used for a long period of time, the surface of the immersion objective can be kept in an uncontaminated state and high-precision observation and measurement can be maintained.

Also, the inverted microscope of Embodiment 2 shown in FIG. 13 is constructed so that the top portion 28d' of the liquid pouring tube 28d of the liquid pouring means 28 is fixed to the stage 21 and when moved, is moved integrally with the stage 21. However, it may be constructed so that the top portion 28d' of the liquid pouring tube 28d of the liquid pouring means 28 is fixed to a supporting member (not shown) different from the stage 21 and is moved independently of the stage 21 when it is possible to move the top portion 28d' independently of the immersion objective 22, to automatically align the relative positions of the liquid pouring position of the liquid pouring means 28 and the immersion objective 22 through the control means 30, and to automatically align the relative positions of the immersion objective 22 on which the liquid is poured by the liquid pouring means 28 and the desired observation position in the stage 21.

In the fluorescence imaging apparatus of Embodiment 2, when it is possible to automatically align the relative positions of the liquid pouring position of the liquid pouring means 28 and the immersion objective 22 and to automatically align the relative positions of the immersion objective 22 on which the liquid is poured by the liquid pouring means 28 and the desired observation position in the stage 21, both the stage 21 and the immersion objective 22 may be moved in a horizontal or vertical direction. However, it is desirable that the relative positions of the immersion objective 22 and the preset well 31a are shifted, at least, in a direction perpendicular to the optical axis of the immersion objective 22.

Further, when the top portion 28d' of the liquid pouring tube 28d of the liquid pouring means 28 is fixed to the supporting member (not shown) different from the stage 21 so that it is moved independently of the stage 21, the top portion 28d' of the liquid pouring tube 28d may be moved in a horizontal or vertical direction.

The fluorescence imaging apparatus of Embodiment 2 shown in FIG. 13 is designed so that the relative positions of the stage 21 and the immersion objective 22 are shifted and thereby the top portion 29c' of the discharge tube 29c is submerged perpendicular to the surface of the liquid stored in the liquid receiving portion 22b of the immersion objective 22. However, when the apparatus is constructed so that the top portion 29c' of the discharge tube 29c is submerged perpendicular to the surface of the liquid stored in the liquid receiving portion 22b of the immersion objective 22, for example, the top portion 29c' of the discharge tube 29c is moved and thereby may be submerged perpendicular to the liquid receiving portion 22b of the immersion objective 22 located below the submergence position of the top portion 29c'.

For example, the discharge tube 29c may be designed to extend horizontally in a longitudinal direction so that the top portion 29c' is bent and to have a rotary axis in the longitudinal direction of the discharge tube 29c or in a horizontal direction perpendicular to the longitudinal direction of the discharge tube 29c so that the rotary axis is rotated and thereby the top portion 29c' is moved in directions in which it is submerged perpendicular to the surface of the liquid stored in the liquid receiving portion 22b and in which it deviates from the surface of the liquid.

The fluorescence imaging apparatus of Embodiment 2 is constructed so that the top portion 29c' of the discharge tube 29 is supported together with the liquid pouring tube 28d by the stage 21, and when the top lens surface 22a of the immersion objective 22 is located at the liquid pouring position of the top portion 28d' of the liquid pouring tube 28, the top portion 29c' of the discharge tube 29c is located at the position where it can be submerge perpendicular to the surface of the liquid stored in the liquid receiving portion 22b.

By doing so, the supply of the liquid to the immersion objective 22 and the discharge of the liquid flowing from the immersion objective 22 can be performed simultaneously, and this raises the efficiency of operation.

Also, the location of the liquid pouring position of the top portion 28d' of the liquid pouring tube 28 may be carried out independently of the location of the position where the top portion 29c' of the discharge tube 29c is submerged.

Also, although in the fluorescence imaging apparatus of Embodiment 2 shown in FIG. 13 the cleaning member 33 is provided on the lower surface of the stage 21, it may be provided on the lower surface of a supporting member (not shown) supporting the liquid pouring means 28, independently of the stage 21. Alternatively, the cleaning member 33 may be provided on the lower side surface of a supporting member (not shown) supporting the suction means 29, independently of the stage 21.

Also, although the fluorescence imaging apparatus of Embodiment 2 shown in FIG. 13 is designed to mount the single immersion objective 22, it may have a revolver in which a plurality of immersion objectives 22 can be switched.

In the fluorescence imaging apparatus of Embodiment 2 shown in FIG. 13, the immersion objective 22 may be exchangeable, or may be fixed to a supporting member (not shown) to be unexchangeable. Even the application of the structure of Embodiment 2 to an inverted microscope provided with the unexchangeable immersion objective brings about the effect that interference with the liquid pouring means 28 or the discharge means 29 is prevented and the high-precision observation can be carried out.

Also, as a modified example of the fluorescence imaging apparatus of Embodiment 2, the apparatus may be constructed so that when a detection means (not shown) detecting a change of the charged state of the liquid between the top lens surface 22 of the immersion objective 22 and the preset well 31a is provided and it is detected through the detection means that the liquid between the top lens surface 22a of the immersion objective 22 and the preset well 31a evaporates to reach the uncharged state, the control means 30 controls the liquid pouring means 28 and the imaging means 24 in such a way as to repeat a series of operations including a single operation that the relative positions of the immersion objective 22 and the preset well 31a are shifted, a single operation that the liquid is poured between the top lens surface 22a of the immersion objective 22 and the preset well 31a by the liquid pouring means 28, a single operation that the immersion objective 22 is aligned with the specimen 32 placed as the observation phosphor in the preset well 31a, and a preset number of times of operations that the observation phosphor is imaged by the imaging means 24; the control means 30 has the functions of the shift means 1' and the alignment means 2' in the fluorescence imaging apparatus of the eighth aspect shown in FIG. 9; and the liquid pouring means 28, the imaging means 24, the detection means (not shown), and the control means 30 correspond to the liquid pouring means 1, the imaging means 2, the detection means 4, and the repeated control means 3, respectively, in the fluorescence imaging apparatus of the eighth aspect shown in FIG. 9 to enable the steps as in the method of imaging fluorescence of the fourth aspect shown in the flow chart of FIG. 5 to be followed.

Also, in the detection means, any structure that the change of the charged state of the liquid between the top lens surface 22a of the immersion objective 22 and the preset well 31a can be detected may be used.

According to the fluorescence imaging apparatus of the modified example of Embodiment 2, like the fluorescence imaging apparatus of Embodiment 2, even though the viewer does not monitor the poured state of the liquid in observation extending over a long term, a favorable poured state of the liquid is automatically maintained and a good fluorescent image can be obtained.

As mentioned above, the method of imaging fluorescence and the fluorescence imaging apparatus of the present invention have additional features listed below.

(1) The method of imaging fluorescence, in which an observation phosphor is imaged for a constant term by the fluorescence imaging apparatus, comprises a set step of setting a vessel incorporating the observation phosphor in the fluorescence imaging apparatus; an imaging step of imaging the observation phosphor in the vessel through an imaging means in a state where a space between the top portion of the immersion objective and the vessel in the fluorescence imaging apparatus is charged with a liquid; a liquid pouring step of charging the space between the top portion of the immersion objective and the vessel with the liquid through a liquid pouring means by receiving the command of a control means after preset time passes; and a repeated step of alternately repeating the imaging step and the liquid pouring step by controlling the imaging means and the liquid pouring means through the control means.

(2) In the method of imaging fluorescence described in item (1), the preset time is previously set in accordance with a state where the liquid between the top portion of the immersion objective and the vessel evaporates.

(3) The method of imaging fluorescence described in item (1) further comprises a shift step of relatively shifting the immersion objective and the vessel so that a distance between them is increased by the control means before the liquid pouring step and an alignment step of relatively shifting the immersion objective and the vessel so that the immersion objective is aligned with the observation phosphor by the control means after the liquid pouring step.

(4) In the method of imaging fluorescence described in item (3), the immersion objective and the vessel are shifted in a direction perpendicular to the optical axis of the immersion objective at the shift step.

(5) The method of imaging fluorescence, in which an observation phosphor is imaged for a constant term by the fluorescence imaging apparatus, comprises a set step of setting a vessel incorporating the observation phosphor in the fluorescence imaging apparatus; an imaging step of imaging the observation phosphor in the vessel through an imaging means in a state where a space between the top portion of the immersion objective and the vessel in the fluorescence imaging apparatus is charged with a liquid; a detection step of detecting a state of the liquid between the immersion objective and the vessel through a detection means; a liquid pouring step of pouring the liquid between the top portion of the immersion objective and the vessel through a liquid pouring means in response to the command ordered from a control means by receiving a detection signal from the detection means; and a repeated step of alternately repeating the imaging step and the liquid pouring step by receiving the detection signal from the detection means to control the imaging means and the liquid pouring means through the control means.

(6) The method of imaging fluorescence described in item (5) further comprises a shift step of relatively shifting the immersion objective and the vessel so that a distance between them is increased by the control means before the liquid pouring step and an alignment step of relatively shifting the immersion objective and the vessel so that the immersion objective is aligned with the observation phosphor by the control means after the liquid pouring step.

(7) In the method of imaging fluorescence described in item (6), the immersion objective and the vessel are shifted in a direction perpendicular to the optical axis of the immersion objective at the shift step.

(8) The fluorescence imaging apparatus, in which an observation phosphor is imaged for a constant term, comprises an imaging means for imaging the observation phosphor in a vessel incorporating the observation phosphor in a state where a space between the top portion of the immersion objective and the vessel is charged with a liquid; a liquid pouring means for pouring the liquid between the top portion of the immersion objective and the vessel; and a control means for controlling the imaging means and the liquid pouring means in such a way that operations that the observation phosphor is imaged and the liquid is poured between the top portion of the immersion objective and the vessel are repeated at preset intervals.

(9) The fluorescence imaging apparatus, in which an observation phosphor is imaged for a constant term, comprises an imaging means for imaging the observation phosphor in a vessel incorporating the observation phosphor in a state where a space between the top portion of the immersion objective and the vessel is charged with a liquid; a detection means for detecting a state of the liquid between the top portion of the immersion objective and the vessel; a liquid pouring means for pouring the liquid between the top portion of the immersion objective and the vessel; and a control means for controlling the imaging means and the liquid pouring means in such a way that operations that the observation phosphor is imaged and the liquid is poured between the top portion of the immersion objective and the vessel by receiving a detection signal from the detection means are repeated.

A reflection-type microscope provided with the immersion objective of the present invention is useful in the field in which it is particularly required to carry out microplate sample observation, time-lapse observation, or observation combing these, by interposing the liquid between an object to be observed, such as a living specimen, and an objective lens placed below the object.

What is claimed is:

1. A method of imaging fluorescence, in which an inverted fluorescence imaging apparatus provided with an immersion objective is used to image an observation phosphor for a constant term, comprising:
    an imaging position locating step of locating a vessel incorporating the observation phosphor at an imaging position of the fluorescence imaging apparatus;
    a liquid pouring step of pouring a preset amount of liquid between a top portion of the immersion objective in the fluorescence imaging apparatus and the vessel incorporating the observation phosphor to bring about a charged state;
    an imaging step of imaging the observation phosphor in the vessel in a state where a space between the top portion of the immersion objective and the vessel is charged with the liquid; and
    a repeated control step of repeating a series of operations including the liquid pouring step of a single operation and the imaging step of a preset number of times of operations performed after the liquid pouring step of the single operation, at preset time intervals.

2. A method of imaging fluorescence according to claim 1, wherein time until the liquid between the top portion of the immersion objective and the vessel, poured at the liquid pouring step, evaporates to reach an uncharged state is previously set as the pre-set time intervals.

3. A method of imaging fluorescence according to claim 1, further comprising a shift step of shifting relative positions of the immersion objective and the vessel so as to separate the immersion objective from the vessel before the liquid pouring step; an alignment step of shifting the relative positions of the immersion objective and the vessel so as to align the immersion objective with the observation phosphor in the vessel between the liquid pouring step and the imaging step; and repeated control step, wherein at the repeated control step, a series of operations including the shift step of a single operation, the liquid pouring step of a single operation performed after the shift step of the single operation, the alignment step of a single operation performed after the liquid pouring step of the single operation, and the imaging step of a preset number of times of operations performed after the alignment step of the single operation, are repeated at preset time intervals.

4. A method of imaging fluorescence according to claim 3, wherein at the shift step, the relative positions of the immersion objective and the vessel are shifted, at least, in a direction perpendicular to an optical axis of the immersion objective.

5. A method of imaging fluorescence, in which an inverted fluorescence imaging apparatus provided with an immersion objective is used to image an observation phosphor for a constant term, comprising:
    an imaging position locating step of locating a vessel incorporating the observation phosphor at an imaging position of the fluorescence imaging apparatus;
    a liquid pouring step of pouring a preset amount of liquid between a top portion of the immersion objective in the fluorescence imaging apparatus and the vessel incorporating the observation phosphor to bring about a charged state;

an imaging step of imaging the observation phosphor in the vessel in a state where a space between the top portion of the immersion objective and the vessel is charged with the liquid;

a detection step of detecting a change of the charged state of the liquid between the top portion of the immersion objective and the vessel, poured at the liquid pouring step; and a repeated control step of repeating a series of operations including the liquid pouring step of a single operation and the imaging step of a preset number of times of operations performed after the liquid pouring step of the single operation when it is detected through the detection step that the liquid between the top portion of the immersion objective and the vessel evaporates to reach an uncharged state.

6. A method of imaging fluorescence according to claim 5, further comprising a shift step of shifting relative positions of the immersion objective and the vessel so as to separate the immersion objective from the vessel before the liquid pouring step; an alignment step of shifting the relative positions of the immersion objective and the vessel so as to align the immersion objective with the observation phosphor in the vessel between the liquid pouring step and the imaging step; and a repeated control step, wherein at the repeated control step, when it is detected through the detection step that the liquid between the top portion of the immersion objective and the vessel evaporates to reach an uncharged state, a series of operations including the shift step of a single operation, the liquid pouring step of a single operation performed after the shift step of the single operation, the alignment step of a single operation performed after the liquid pouring step of the single operation, and the imaging step of a preset number of times of operations performed after the alignment step of the single operation, are repeated.

7. A method of imaging fluorescence according to claim 6, wherein at the shift step, the relative positions of the immersion objective and the vessel are shifted, at least, in a direction perpendicular to an optical axis of the immersion objective.

8. A fluorescence imaging apparatus, which is an inverted fluorescence imaging apparatus provided with an immersion objective in which an observation phosphor is observed for a constant term, comprising:

liquid pouring means for pouring a preset amount of liquid between a top portion of the immersion objective and a vessel incorporating the observation phosphor;

imaging means for imaging the observation phosphor in the vessel in a state where a space between the top portion of the immersion objective and the vessel is charged with the liquid; and repeated control means for controlling the liquid pouring means and the imaging means in such a way that a series of operations including a single operation that the liquid is poured between the top portion of the immersion objective and the vessel by the liquid pouring means and a preset number of times of operations that the observation phosphor is imaged by the imaging means are repeated at preset time intervals.

9. A fluorescence imaging apparatus according to claim 8, further comprising shift means for shifting relative positions of the immersion objective and the vessel so as to separate the immersion objective from the vessel and alignment means for shifting the relative positions of the immersion objective and the vessel so as to align the immersion objective with the observation phosphor in the vessel, wherein the repeated control means is constructed to control the shift means, the liquid pouring means, the alignment means, and the imaging means in such a way that a series of operations including a single operation that the relative positions of the immersion objective and the vessel are shifted by the shift means, a single operation that the liquid is poured between the top portion of the immersion objective and the vessel by the liquid pouring means, a single operation that the immersion objective is aligned with the observation phosphor in the vessel by the alignment means, and a preset number of times of operations that the observation phosphor is imaged by the imaging means are repeated at preset time intervals.

10. A fluorescence imaging apparatus, which is an inverted fluorescence imaging apparatus provided with an immersion objective in which an observation phosphor is observed for a constant term, comprising:

liquid pouring means for pouring a preset amount of liquid between a top portion of the immersion objective and a vessel incorporating the observation phosphor;

imaging means for imaging the observation phosphor in the vessel in a state where a space between the top portion of the immersion objective and the vessel is charged with the liquid;

detection means for detecting a change of a charged state of the liquid between the top portion of the immersion objective and the vessel; and repeated control means for controlling the liquid pouring means and the imaging means in such a way as to repeat a series of operations including a single operation that the liquid is poured between the top portion of the immersion objective and the vessel by the liquid pouring means and a preset of number of times of operations that the observation phosphor is imaged by the imaging means when it is detected through the detection means that the liquid between the top portion of the immersion objective and the vessel evaporates to reach an uncharged state.

11. A fluorescence imaging apparatus according to claim 10, further comprising shift means for shifting relative positions of the immersion objective and the vessel so as to separate the immersion objective from the vessel and alignment means for shifting the relative positions of the immersion objective and the vessel so as to align the immersion objective with the observation phosphor in the vessel, wherein the repeated control means is constructed to control the shift means, the liquid pouring means, the alignment means, and the imaging means in such a way as to repeat a series of operations including a single operation that the relative positions of the immersion objective and the vessel are shifted by the shift means, a single operation that the liquid is poured between the top portion of the immersion objective and the vessel by the liquid pouring means, a single operation that the immersion objective is aligned with the observation phosphor in the vessel by the alignment means, and a preset number of times of operations that the observation phosphor is imaged by the imaging means when it is detected through the detection means that the liquid between the top portion of the immersion objective and the vessel evaporates to reach an uncharged state.

12. A method of imaging fluorescence according to any one of claims 1-7, wherein the vessel is a preset well on a multiple-well plate having a plurality of wells.

13. A fluorescence imaging apparatus according to any one of claims 8-11, wherein the vessel is a preset well on a multiple-well plate having a plurality of wells.

* * * * *